(12) United States Patent
Grindstaff et al.

(10) Patent No.: US 10,860,893 B2
(45) Date of Patent: Dec. 8, 2020

(54) AUTOMATED AND CUSTOMIZED POST-PRODUCTION RELEASE REVIEW OF A MODEL

(71) Applicant: McAfee, LLC, Santa Clara, CA (US)

(72) Inventors: Lynda M. Grindstaff, Folsom, CA (US); Celeste R. Fralick, Lubbock, TX (US)

(73) Assignee: McAfee, LLC, San Jose, CA (US)

( * ) Notice: Subject to any disclaimer, the term of this patent is extended or adjusted under 35 U.S.C. 154(b) by 121 days.

(21) Appl. No.: 15/940,082

(22) Filed: Mar. 29, 2018

(65) Prior Publication Data

US 2018/0285691 A1 Oct. 4, 2018

Related U.S. Application Data

(60) Provisional application No. 62/479,876, filed on Mar. 31, 2017.

(51) Int. Cl.
| | |
|---|---|
| *G06K 9/62* | (2006.01) |
| *G06F 17/18* | (2006.01) |
| *G06N 20/00* | (2019.01) |
| *G06Q 10/04* | (2012.01) |

(52) U.S. Cl.
CPC .......... *G06K 9/6262* (2013.01); *G06F 17/18* (2013.01); *G06K 9/6256* (2013.01); *G06K 9/6265* (2013.01); *G06K 9/6284* (2013.01); *G06N 20/00* (2019.01); *G06Q 10/04* (2013.01)

(58) Field of Classification Search
CPC ....... G06N 20/00; G06F 17/18; G06K 9/6262
See application file for complete search history.

(56) References Cited

U.S. PATENT DOCUMENTS

2016/0350671 A1* 12/2016 Morris, II .............. G06N 20/00

OTHER PUBLICATIONS

Kriegel, Hans-Peter, et al. "LoOP: local outlier probabilities." Proceedings of the 18th ACM conference on Information and knowledge management. 2009. (Year: 2009).*

Rousseeuw, Peter J., and Mia Hubert. "Robust statistics for outlier detection." Wiley Interdisciplinary Reviews: Data Mining and Knowledge Discovery 1.1 (2011): 73-79. (Year: 2011).*

(Continued)

*Primary Examiner* — Eric Nilsson
(74) *Attorney, Agent, or Firm* — Hanley, Flight & Zimmerman, LLC

(57) ABSTRACT

A method for automated assessment of a model includes: training a model to perform a prediction, diagnostic, or classification operation based on a training dataset; deploying the model in production to perform the operation on field data; monitoring signal data associated with the model automatically, the signal data including specific or derived signal data representing characteristics of an ecosystem in which the model is deployed and new observations in incoming field data; monitoring accuracy of the model by applying a statistical tool to a plurality of data points of the signal data; determining whether the signal data represents an unstable process by identifying outlier data points from among the plurality of data points of the signal data; generating an indication that a corrective action should be taken on the model based on a result of the determination; and displaying the indication on a display.

20 Claims, 7 Drawing Sheets

(56) References Cited

OTHER PUBLICATIONS

Ray, Soumi, and Adam Wright. "Detecting anomalies in alert firing within clinical decision support systems using anomaly/outlier detection techniques." Proceedings of the 7th ACM International Conference on Bioinformatics, Computational Biology, and Health Informatics. 2016. (Year: 2016).*

* cited by examiner

| AREA OF CHART | PROBABILITY | CHART DESIGNATION | ZONE |
|---|---|---|---|
| ABOVE OUTER THIRD | .00135 | ABOVE 3σ | |
| OUTER THIRD | .02135 | ABOVE 2σ | ZONE A |
| MIDDLE THIRD | .1360 | ABOVE 1σ | ZONE B |
| INNER THIRD | .3413 | ABOVE CENTERLINE, X-BAR | ZONE C |
| INNER THIRD | .3413 | BELOW CENTERLINE, X-BAR | ZONE C |
| MIDDLE THIRD | .1360 | BELOW 1σ | ZONE B |
| OUTER THIRD | .02135 | BELOW 2σ | ZONE A |
| BELOW OUTER THIRD | .00135 | BELOW 3σ | |

510

| POINT LOCATION THAT VIOLATES STATISTICAL THRESHOLDS | PROBABILITY OF THE POINT OCCURRING IN THIS ZONE |
|---|---|
| SINGLE POINT OUTSIDE OF THE 3 SIGMA LIMIT | .0013 |
| 2 OUT OF 3 SUCCESSIVE POINTS FALL IN ZONE A OR BEYOND | .0015 |
| 4 OUT OF 5 POINTS FALL IN ZONE B OR BEYOND | .0027 |
| 8 IN A ROW FALL IN ZONE C OR BEYOND ON ONE SIDE | .0039 |

FIG. 6

| RULE | POINT LOCATION | DETECTION |
|------|----------------|-----------|
| RULE 1 | ONE POINT BEYOND ZONE A | DETECTS A SHIFT IN THE MEAN, AN INCREASE IN THE STANDARD DEVIATION, OR A SINGLE ABERRATION IN THE PROCESS. |
| RULE 2 | NINE POINTS IN A ROW IN A SINGLE (UPPER OR LOWER) SIDE OF ZONE C OR BEYOND | DETECTS A SHIFT IN THE PROCESS MEAN. |
| RULE 3 | SIX POINTS IN A ROW STEADILY INCREASING OR DECREASING | DETECTS A TREND OR DRIFT IN THE PROCESS MEAN. SMALL TRENDS WILL BE SIGNALED BY THIS TEST BEFORE TEST 1. |
| RULE 4 | FOURTEEN POINTS IN A ROW ALTERNATING UP AND DOWN | DETECTS SYSTEMATIC EFFECTS SUCH AS TWO ALTERNATELY USED MACHINES, VENDORS, OR OPERATORS. |
| RULE 5 | TWO OUT OF THREE POINTS IN A ROW IN ZONE A OR BEYOND AND THE POINT ITSELF IS IN ZONE A OR BEYOND. | DETECTS A SHIFT IN THE PROCESS AVERAGE OR INCREASE IN THE STANDARD DEVIATION. ANY TWO OUT OF THREE POINTS PROVIDE A POSITIVE TEST. |
| RULE 6 | FOUR OUT OF FIVE POINTS IN A ROW IN ZONE B OR BEYOND AND THE POINT ITSELF IS IN ZONE B OR BEYOND. | DETECTS A SHIFT IN THE PROCESS MEAN. ANY FOUR OUT OF FIVE POINTS PROVIDE A POSITIVE TEST. |
| RULE 7 | FIFTEEN POINTS IN A ROW IN ZONE C, ABOVE AND BELOW THE CENTER LINE | DETECTS STRATIFICATION OF SUBGROUPS WHEN THE OBSERVATIONS IN A SINGLE SUBGROUP COME FROM VARIOUS SOURCES WITH DIFFERENT MEANS. |
| RULE 8 | EIGHT POINTS IN A ROW ON BOTH SIDES OF THE CENTER LINE WITH NONE IN ZONES C | DETECTS STRATIFICATION OF SUBGROUPS WHEN THE OBSERVATIONS IN ONE SUBGROUP COME FROM A SINGLE SOURCE, BUT SUBGROUPS COME FROM DIFFERENT SOURCES WITH DIFFERENT MEANS. |

US 10,860,893 B2

AUTOMATED AND CUSTOMIZED POST-PRODUCTION RELEASE REVIEW OF A MODEL

TECHNICAL FIELD

Embodiments described herein generally relate to the field of data science and in particular to techniques for assessing models after they are put into production.

BACKGROUND ART

In analytics, machine learning and deep learning, models are created based on data inputs, features, architecture, and customer requirements available at the time of development. Models may be periodically updated when out in the field; however, many models may not be updated at all which then leads to lower accuracy rates and customer dissatisfaction. While the "learning" of machine or deep learning is typically performed automatically, it does not consider (or can be substantially skewed by) data decay, process changes (internally and externally), changing inputs, new features, or the new, underlying prevalence (the "base rate") of a very low occurrence, to name just a few. The end users of the models do not know they are inaccurate until error rates spike (e.g., false negatives, false positives, root mean square error), and an experienced data scientist performs the research to assess the cause of the spike. This is often reactive. In addition, in some cases, models are applied after substantial filtering, down-sampling, or other equations have occurred, which then may render the learning model to be inaccurate, at best, or lead to serious customer security ramifications, at worst. As data continues to increase, complexity of internal processes may increase, thus leading to increased propensity of incorrect model application.

Currently, these models require manual update following these costly errors, inaccuracies, and inadvertent internal process manipulations that are above and beyond the automatic "learning" of a machine or deep learning model. Not only is it costly to the user/customer of the analytic model as inaccuracies have spiked, but it is resource intensive to have a manual check performed of the models post-production release as model information is often lost or misplaced, or the subject matter experts are no longer available. A better and more proactive approach to model assessment would be desirable.

BRIEF DESCRIPTION OF DRAWINGS

FIG. 5 shows tables of exemplary statistical process control (SPC) thresholds and probabilities according to one or more embodiments disclosed herein.

FIG. 6 is a table illustrating exemplary SPC rules according to one or more embodiments disclosed herein.

DESCRIPTION OF EMBODIMENTS

Figure 1:
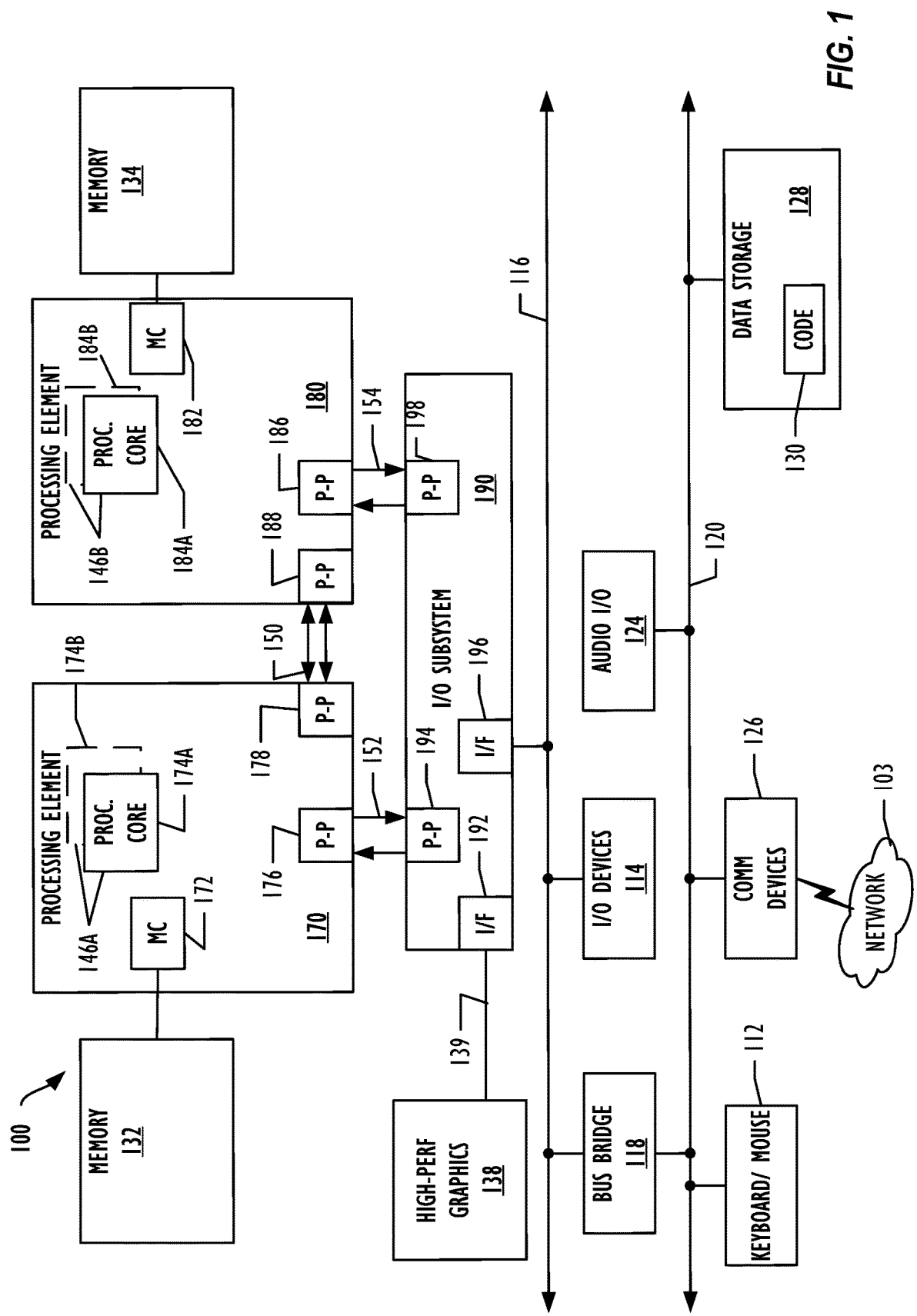
FIGS. 1-2 are block diagrams illustrating a computing device for use with techniques according to two or more embodiments disclosed herein.

In the following description, for purposes of explanation, numerous specific details are set forth in order to provide a thorough understanding of the inventions. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instances of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the inventions, and multiple references to "one embodiment" or "an embodiment" should not be understood as necessarily all referring to the same embodiment.

The embodiments described herein are examples and for illustrative purposes. Persons of ordinary skill in the art will recognize that alternative techniques for implementing the disclosed subject matter may be used. Elements of example embodiments may be arranged in different arrangements or combined with elements of different example embodiments. For example, the order of execution of blocks and flow charts may be changed. Some of the blocks of those flowcharts may be changed, eliminated, or combined and other blocks may be added as desired.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "processor" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processor to perform an action may program any or all of the processors to perform the indicated action. Where the processor is one or more multicore processors, instructions that when executed program the processor to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the memory. The memory may be any type of storage device, including random access memory, read-only memory, optical and electromechanical disk drives, etc.

This disclosure pertains to automated, real-time assessment of a mathematical model that has been released out into the field to determine whether the accuracy and efficiency of the model for performing a prediction, classification or diagnostic operation remains satisfactory over time. The assessment determines whether the model has deteriorated over time due to a variety of factors (e.g., data decay, process changes, changing inputs, new features, changes to ecosystem, new observations, new enterprise-related functions). The mathematical model may be implemented as a machine or deep learning model that is trained to perform a predetermined operation (e.g., detect malware). The model may be periodically updated by retraining the model with new incoming dataset (learning) in which new observations are made. However, due to changes to environmental factors of an ecosystem in which the model operates or changes to the incoming dataset due to filtering or new observations (e.g., new malware), accuracy and efficiency of the model may deteriorate over time. As a result, even if the latest software is installed with the latest build, if the underlying mathematical model is outdated, overall efficiency and accuracy of the software, e.g., in detecting malware with low false positives, low false negatives and low error rate, will be diminished.

Solutions presented herein propose identifying and automatically monitoring signal data from incoming dataflow associated with the deployed model in production to thereby automatically monitor accuracy and efficiency of the model. Statistical tools are applied to the signal data to determine whether corrective action (e.g., model update, investigate root cause of out of control signal) needs to be performed and performance of the correction is indicated based on the determination. The statistical tools may include Statistical process control (SPC) and autoregressive integrated moving average (ARIMA) models that may be applied to data points of incoming signal data that is trended over time. The signal data may be specific or derived signal data identified from incoming dataflow and may indicate changes to environmental factors of the ecosystem in which the model operates or changes to the incoming dataset due to filtering or new observations (e.g., new malware). By applying statistical tools, outlier data points of the signal data (i.e., out of control signal(s)) may be identified (or predicted). That is, a determination regarding whether a deviation of data points from a norm is within a "normal" variation (e.g., beyond six-sigma) range may be made. If the deviation is determined to be beyond the "normal" variation range (e.g., based on so-called "Western Electric Rules"), performance of a corrective action (e.g., update model, investigate root cause of out of control signal) may be indicated, and application of the statistical tools may be continued on an updated model to detect or predict outliers with the updated model.

SPC is a method of quality control which uses statistical methods. SPC has traditionally been applied in order to monitor and control a manufacturing process. Monitoring and controlling the manufacturing process ensures that it operates at its full potential and ensures that variability within the process is detected. At its full potential, the manufacturing process can make as much conforming product as possible with a minimum (if not an elimination) of waste (rework or scrap). Although SPC has been in use in manufacturing fields for decades, SPC techniques have never been applied to perform automated assessment of a model deployed in production. That is, because SPC is a manufacturing tool, it has not been applied in other fields (e.g., healthcare, finance, technology, or cybersecurity). Instead, subjective techniques such as arbitrary thresholds are generally used where any assessment is performed, and in many cases once a model is put into production, no assessment is ever performed until problems with the model get so bad that an assessment becomes critical. Because the way of assessing accuracy of a model may be unique for each model, SPC techniques may involve customized SPC efforts and gathering of data related to accuracy of the model. SPC may allow assessment of the variability of the "before state" to the "after state" automatically, without having to be concerned about what is happening between the two states. In this manner, process changes such as down-sampling or filtering (especially internally) can be performed without constant and heightened concern to the actual change. Thus, SPC may enable highlighting for attention for further model evaluation, only those changes that may be seen as outside "normal" variability.

Referring now to FIG. 1, a block diagram illustrates a programmable device 100 that may be used for implementing the techniques described herein in accordance with one or more embodiments. The programmable device 100 illustrated in FIG. 1 is a multiprocessor programmable device that includes a first processing element 170 and a second processing element 180. While two processing elements 170 and 180 are shown, an embodiment of programmable device 100 may also include only one such processing element.

Programmable device 100 is illustrated as a point-to-point interconnect system, in which the first processing element 170 and second processing element 180 are coupled via a point-to-point interconnect 150. Any or all of the interconnects illustrated in FIG. 1 may be implemented as a multi-drop bus rather than point-to-point interconnects.

As illustrated in FIG. 1, each of processing elements 170 and 180 may be multicore processors, including first and second processor cores (i.e., processor cores 174a and 174b and processor cores 184a and 184b). Such cores 174a, 174b, 184a, 184b may be configured to execute instruction code. However, other embodiments may use processing elements that are single core processors as desired. In embodiments with multiple processing elements 170, 180, each processing element may be implemented with different numbers of cores as desired.

Each processing element 170, 180 may include at least one shared cache 146. The shared cache 146a, 146b may store data (e.g., instructions) that are utilized by one or more components of the processing element, such as the cores 174a, 174b and 184a, 184b, respectively. For example, the shared cache may locally cache data stored in a memory 132, 134 for faster access by components of the processing elements 170, 180. In one or more embodiments, the shared cache 146a, 146b may include one or more mid-level caches, such as level 2 (L2), level 3 (L3), level 4 (L4), or other levels of cache, a last level cache (LLC), or combinations thereof.

While FIG. 1 illustrates a programmable device with two processing elements 170, 180 for clarity of the drawing, the scopes of the present inventions are not so limited and any number of processing elements may be present. Alternatively, one or more of processing elements 170, 180 may be an element other than a processor, such as a graphics processing unit (GPU), a digital signal processing (DSP) unit, a field programmable gate array, or any other programmable processing element. Processing element 180 may be heterogeneous or asymmetric to processing element 170. There may be a variety of differences between processing elements 170, 180 in terms of a spectrum of metrics of merit including architectural, microarchitectural, thermal, power consumption characteristics, and the like. These differences may effectively manifest themselves as asymmetry and heterogeneity amongst processing elements 170, 180. In some embodiments, the various processing elements 170, 180 may reside in the same die package.

First processing element 170 may further include memory controller logic (MC) 172 and point-to-point (P-P) interconnects 176 and 178. Similarly, second processing element 180 may include a MC 182 and P-P interconnects 186 and 188. As illustrated in FIG. 1, MCs 172 and 182 couple processing elements 170, 180 to respective memories, namely a memory 132 and a memory 134, which may be portions of main memory locally attached to the respective processors. While MC logic 172 and 182 is illustrated as integrated into processing elements 170, 180, in some embodiments the memory controller logic may be discrete logic outside processing elements 170, 180 rather than integrated therein.

Processing element 170 and processing element 180 may be coupled to an I/O subsystem 190 via respective P-P interconnects 176 and 186 through links 152 and 154. As illustrated in FIG. 1, I/O subsystem 190 includes P-P interconnects 194 and 198. Furthermore, I/O subsystem 190 includes an interface 192 to couple I/O subsystem 190 with a high performance graphics engine 138. In one embodiment, a bus (not shown) may be used to couple graphics engine 138 to I/O subsystem 190. Alternately, a point-to-point interconnect 139 may couple these components.

In turn, I/O subsystem 190 may be coupled to a first link 116 via an interface 196. In one embodiment, first link 116 may be a Peripheral Component Interconnect (PCI) bus, or a bus such as a PCI Express bus or another I/O interconnect bus, although the scopes of the present inventions are not so limited.

As illustrated in FIG. 1, various I/O devices 114, 124 may be coupled to first link 116, along with a bridge 118 that may couple first link 116 to a second link 120. In one embodiment, second link 120 may be a low pin count (LPC) bus. Various devices may be coupled to second link 120 including, for example, a keyboard/mouse 112, communication device(s) 126 (which may in turn be in communication with the computer network 103), and a data storage unit 128 such as a disk drive or other mass storage device which may include code 130, in one embodiment. The code 130 may include instructions for performing embodiments of one or more of the techniques described herein. Further, an audio I/O 124 may be coupled to second link 120.

Note that other embodiments are contemplated. For example, instead of the point-to-point architecture of FIG. 1, a system may implement a multi-drop bus or another such communication topology. Although links 116 and 120 are illustrated as busses in FIG. 1, any desired type of link may be used. In addition, the elements of FIG. 1 may alternatively be partitioned using more or fewer integrated chips than illustrated in FIG. 1.

Figure 2:
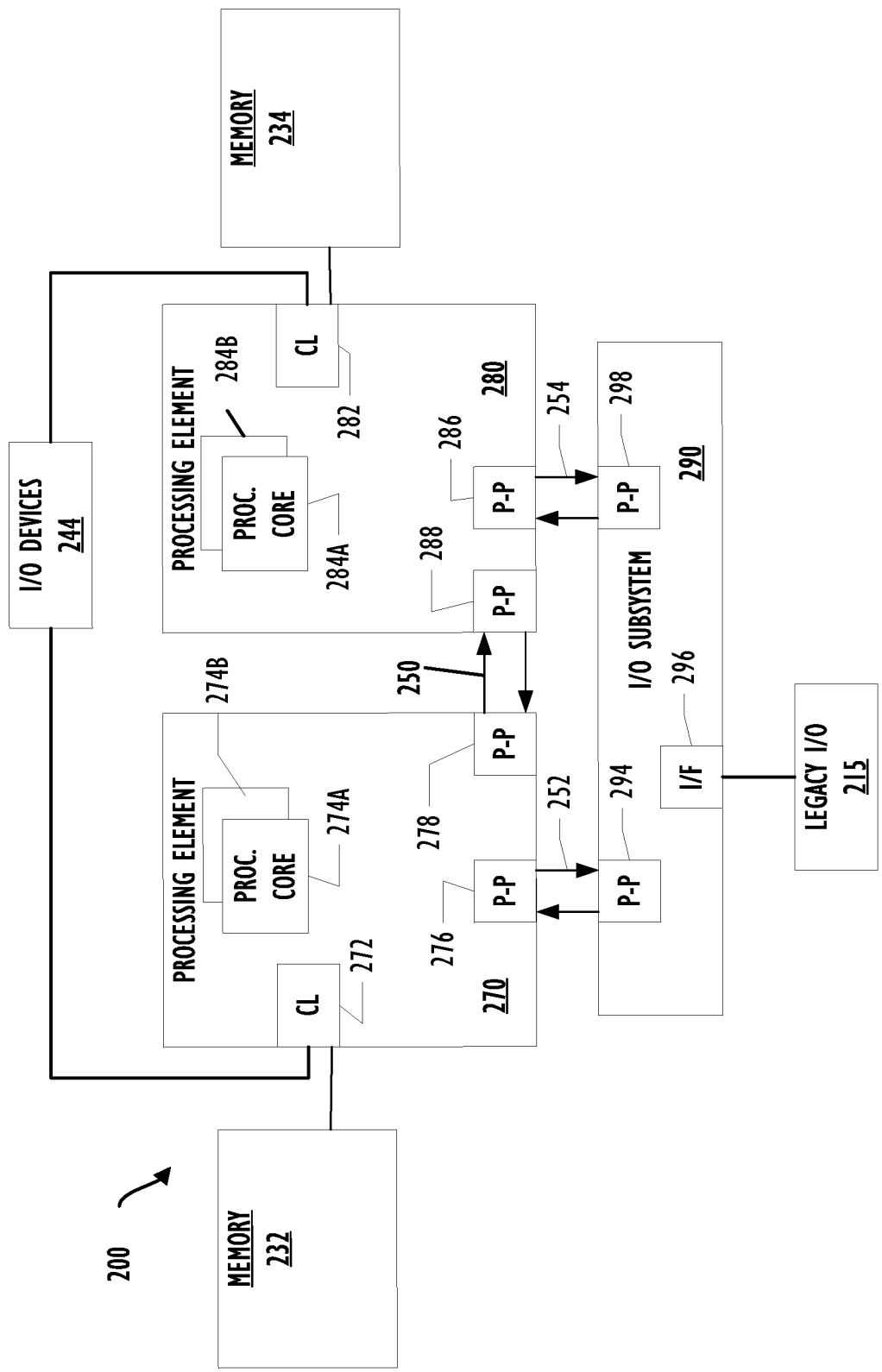

Referring now to FIG. 2, a block diagram illustrates a programmable device 200 according to one or more embodiments. Certain aspects of FIG. 2 have been omitted from FIG. 2 in order to avoid obscuring other aspects of FIG. 2.

FIG. 2 illustrates that processing elements 270, 280 may include integrated memory and I/O control logic ("CL") 272 and 282, respectively. In some embodiments, the 272, 282 may include memory control logic (MC) such as that described above in connection with FIG. 1. In addition, CL 272, 282 may also include I/O control logic. FIG. 2 illustrates that not only may the memories 232, 234 be coupled to the CL 272, 282, but also that I/O devices 244 may also be coupled to the control logic 272, 282. Legacy I/O devices 215 may be coupled to the I/O subsystem 290 by interface 296. Each processing element 270, 280 may include multiple processor cores, illustrated in FIG. 2 as processor cores 274A, 274B, 284A and 284B. As illustrated in FIG. 2, I/O subsystem 290 includes point-to-point (P-P) interconnects 294 and 298 that connect to P-P interconnects 276 and 286 of the processing elements 270 and 280 with links 252 and 254. Processing elements 270 and 280 may also be interconnected by link 250 and interconnects 278 and 288, respectively.

The programmable devices depicted in FIGS. 1 and 2 are schematic illustrations of embodiments of programmable devices that may be utilized to implement various embodiments discussed herein. Various components of the programmable devices depicted in FIGS. 1 and 2 may be combined in a system-on-a-chip (SoC) architecture.

Figure 3:
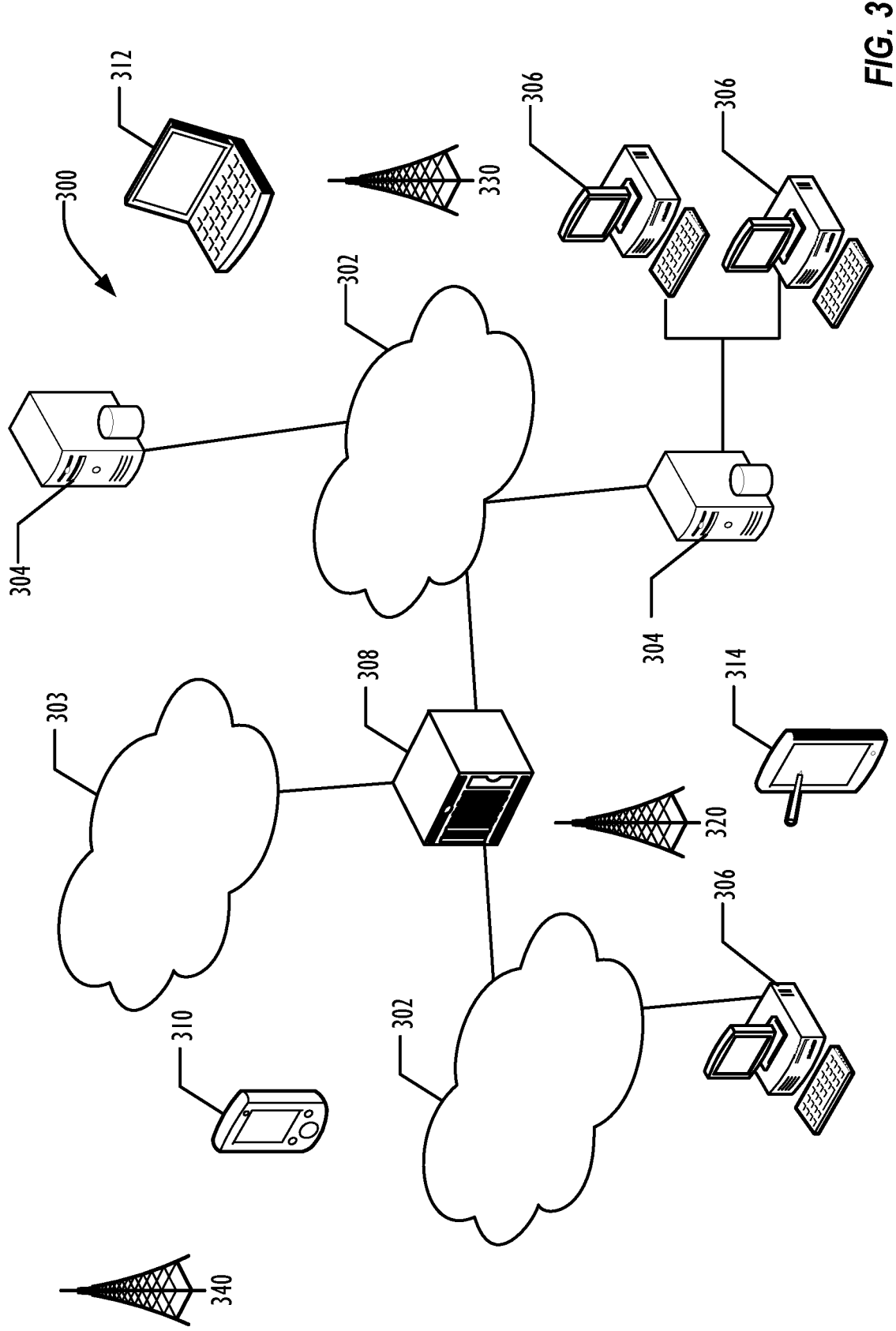
FIG. 3 is a block diagram illustrating a network of programmable devices that may be used as an ecosystem according to one or more embodiments disclosed herein.

Referring now to FIG. 3, an example ecosystem 300 in which the techniques described herein may be implemented is illustrated schematically. Ecosystem 300 contains computer networks 302. Computer networks 302 may include many different types of computer networks available today, such as the Internet, a corporate network or a Local Area Network (LAN). Each of these networks can contain wired or wireless programmable devices and operate using any number of network protocols (e.g., TCP/IP). Networks 302 may be connected to gateways and routers (represented by 308), end user computers 306, and computer servers 304. Ecosystem 300 also includes cellular network 303 for use with mobile communication devices. Mobile cellular networks support mobile phones and many other types of mobile devices. Mobile devices in ecosystem 300 are illustrated as mobile phones 310, laptops 312 and tablets 314. A mobile device such as mobile phone 310 may interact with one or more mobile provider networks as the mobile device moves, typically interacting with a plurality of mobile network towers 320, 330, and 340 for connecting to cellular network 303. Although referred to as a cellular network in FIG. 3, a mobile device may interact with towers of more than one provider network, as well as with multiple non-cellular devices such as wireless access points and routers 308. In addition, the mobile devices 310, 312 and 314 may interact with non-mobile devices such as computers 304 and 306 for desired services.

Mathematical models may be deployed anywhere in ecosystem 300, and automated assessment techniques disclosed herein may be performed where the models are deployed or elsewhere, collecting data from the models and sending it for analysis at the location for deploying the SPC techniques described herein. Models may be created and deployed at an end user node or deployed on the cloud or at a back-office. Data from the model may be assessed at any location in ecosystem 300 or on the cloud or back-office. Simple statistical models do not learn, but machine and deep learning models rely on automated learning over time; that is, following training and validation, new data is compared to the model to provide a predicted response (and classification). Known data and known responses are used to create the model. New data is fed into the model, which produces predicted (or classification or diagnostic) responses to the new input data.

Figure 4:
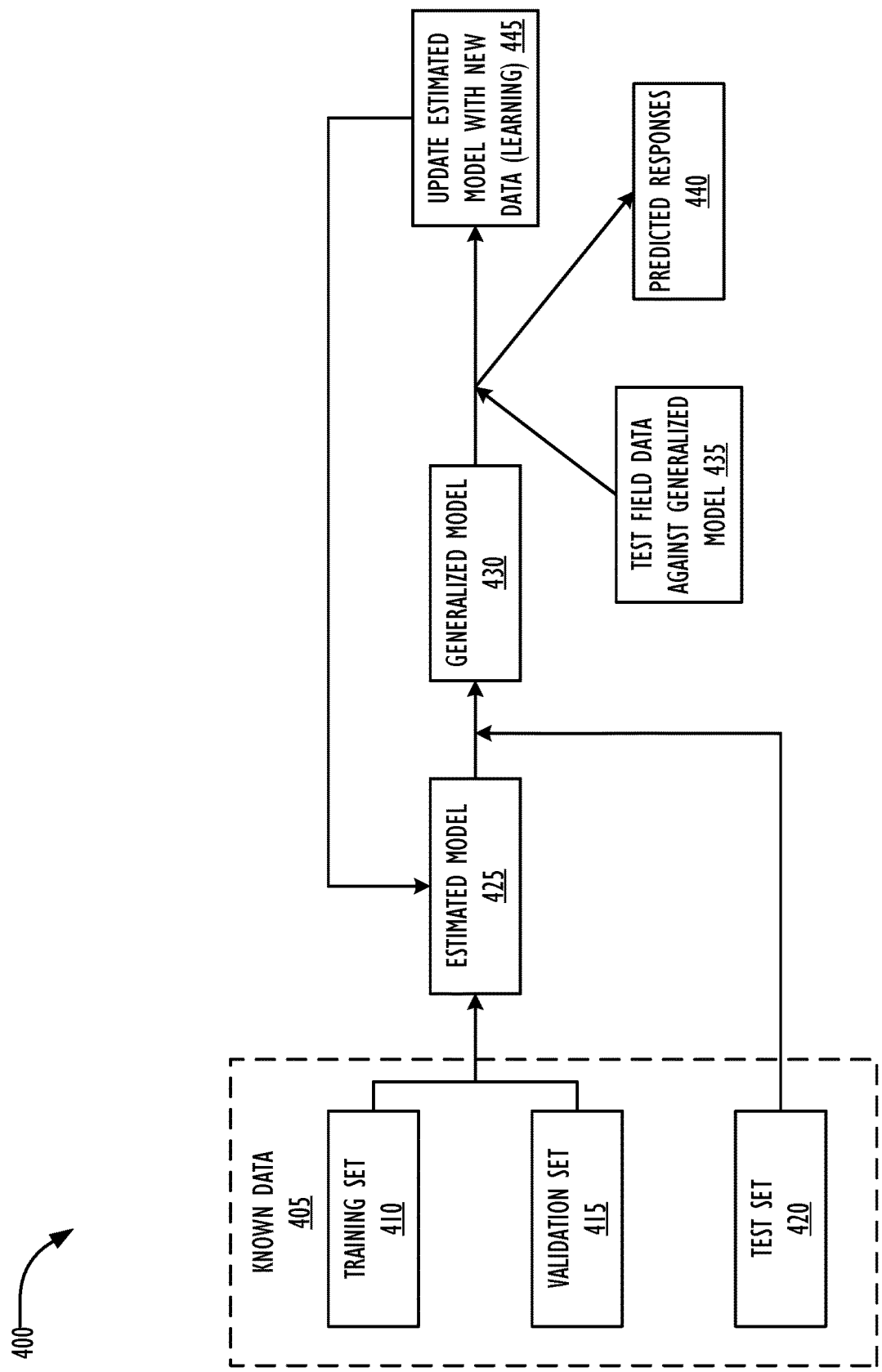
FIG. 4 is a dataflow graph illustrating a general technique for automated analytics that learns over time and recognizes patterns according to one or more embodiments disclosed herein.

FIG. 4 is a dataflow graph 400 illustrating a general technique for automated analytics that learns over time and recognizes patterns according to one or more embodiments disclosed herein. Known data 405 is used to build a mathematical model (e.g., machine or deep learning model) for making data-driven predictions or decisions (classification or diagnosis). Known data 405 may include known features and known responses used to train, validate and test a model that is then deployed as generalized model 430 in the field to make predictions or decisions related to a process or system. Programmable device 100 (or programmable device 200) may subject known data 405 to pre-processing to clean and prepare the data to make it suitable for consumption by model training algorithms. An algorithm is a mathematical function that performs certain predetermined analysis on data and discovers insights from the data. The algorithm feeds a mathematical model which looks at characteristics of a process being examined and predicts how a system will behave with different variables. For example, the data may be visualized and analyzed to run sanity checks to validate the quality of the data and to understand the data. Known data 405 may include variables and features that are attributes of examples that can be used to identify patterns to predict a target answer. Known data 405 may further include data that is labeled as a target (correct answer) associated with the attributes of the examples that the algorithm is intended to learn from and predict based on. After training, generalized model 430 is deployed and designed to predict the answer on data for which the target answer is not known. Programmable device 100 may further subject known data 405 to feature processing to make the features and variables of the dataset more meaningful. Feature processing may include forming more generalizable data points to learn from to provide significant improvements to the predictive, classification or diagnostic model. Common types of feature processing performed on the data may include replacing missing or invalid data, forming Cartesian products of one variable with another, non-linear transformations, creating domain-specific features, and creating variable-specific features.

After pre-processing, programmable device 100 may enable (in hardware, software, or both) splitting known data 405 into training dataset 410, validation dataset 415, and test dataset 420, in order to evaluate the model to estimate the quality of its pattern generalization for data the model has not been trained on. That is, since future data instances have unknown target values that cannot be used for checking accuracy of predictions of the model, some of the data from known data 405 for which we already know the answer of the prediction target for each row is used to evaluate the accuracy of the model (and underlying algorithm). For example, 70-80% of known data 405 may be used for training and 20-30% may be used for validation and testing. Further, programmable device 100 may use data in training dataset 410 to train models to see patterns and use data in test dataset 420 to evaluate predictive quality of the trained model. In one embodiment, programmable device 100 may further split training data into training dataset 410 and validation dataset 415. Programmable device 100 may then use training dataset 410 to train different models by applying different classifiers and algorithms. Examples of machine learning algorithms that may be used to train the model may include a naïve Bayes Classifier Algorithm, K Means Clustering Algorithm, Support Vector Machine Algorithm, Linear Regression, Logistic Regression, any kind of Neural Network, Random Forests, Decision Trees, Nearest Neighbors, or Gaussian process. That is, in order to find the most suitable classifier or algorithm for the problem to be solved by the model, programmable device 100 may use the training dataset 410 to train multiple candidate algorithms, and use the validation dataset 415 to compare their performances and decide which candidate algorithm to select. Programmable device 100 may then create estimated model 425 based on the selected algorithm. Once estimated model 425 is created, programmable device 100 may use test dataset 420 to obtain performance characteristics such as accuracy, sensitivity, specificity, F-measure and the like of the selected algorithm to create generalized model 430. Thus, validation dataset 415 may function as a hybrid dataset that is used as training data by testing, but neither as part of the low-level training nor as part of the final testing.

Programmable device 100 may further tune hyperparameters or training parameters to improve predictive performance of generalized model 430. In one embodiment, the candidate algorithms may be supervised, unsupervised or reinforcement machine learning algorithms depending on the characteristics of incoming data. Further, before deploying generalized model 430 in production, programmable device 100 may take steps to improve performance and accuracy of the model by improving model fit by determining whether the predictive model is overfitting or underfitting training dataset 410 by looking at prediction error on training dataset 410 and validation dataset 415. The model is overfitting training dataset 410 when accuracy of training dataset 410 is higher than validation dataset 415. Conversely, the model is underfitting training dataset 410 when the model performs poorly on training dataset 410. Programmable device 100 may indicate corrective action to achieve balanced model fit before generalized model 430 is deployed. Once generalized model 430 that performs well is deployed, the model may be used to make predictions (or classification, diagnosis) on test field dataset 435 (i.e., incoming data) to generate predicted responses 440 (i.e., perform a prediction operation, diagnostic operation or classification operation on field data). In one embodiment, programmable device 100 may make batch predictions using generalized model 430 to generate predictions for a set of observations (incoming dataset) all at once and take action on a certain percentage of the observations. Alternately, programmable device 100 may generate predictions on a one-by-one basis in real-time for each example independent of the other examples based on incoming data.

In order to keep generalized model 430 predicting accurately, programmable device 100 may continuously monitor incoming data and indicate that the model be updated (retrained) 445 based on new incoming data if programmable device 100 determines that data distribution of data on which programmable device 100 is making predictions has deviated significantly from data distribution of original training dataset 410. Alternately, programmable device 100 may simply indicate that the model be retrained 445 periodically (e.g., daily, weekly, or monthly) regardless of whether the data distribution has changed. Data distribution may change for a variety of reasons. Generalized model 430 is created based on data available at the time the model was created and deployed, and known data 405 may be pre-preprocessed (and generalized model 430 may be programmed) based on a particular configuration (platform) of ecosystem 300 that existed at the time of deployment of generalized model 430. That is, when generalized model 430 was originally developed and deployed in ecosystem 300, programmable device 100 may have made several assumptions relating to ecosystem 300 (e.g., data pipeline processes) that may change over time and no longer hold true. For example, data distribution may change because of changing infrastructure (hardware, software, or cloud-based) of ecosystem 300, new ways of performing enterprise-related functions on ecosystem 300, environmental changes (e.g., new hardware or software, add/delete/change process at any node in the supply chain (i.e., nodes of any of end user, enterprise employee, security operation center (SOC), information technology professional deploying new software)) of ecosystem 300, new observations made (e.g., new forms of malware) that didn't exist at the time of model creation, and change in back-end operations (e.g., increased automation, outsourcing operations to the cloud) that affect incoming field data. Incoming data may also have been modified by undergoing processing by various types of filters due to changes to ecosystem 300 that are unknown to the model. For example, incoming data may have been subject to one or more transforms (e.g., fast Fourier transform), down sampling, and other modifications to reduce, change or 'cherry pick' the data for monitoring. These modifications may affect various aspects of ecosystem 300 including the data distribution. As a result, data distribution of incoming data may deviate significantly from known data 405 that was used to train generalized model 430 with different filtering on known data 405 and different characteristics of ecosystem 300, thereby lowering accuracy and efficiency of generalized model 430 over time and requiring updating and retraining of estimated model 425 based on the new incoming data.

In order to determine whether data distribution of incoming data has changed significantly, predetermined specific signals associated with generalized model 430 and ecosystem 300 are identified and programmable device 100 may automatically monitor the predetermined signals for change by detecting and trending corresponding data points over time and comparing a difference in value of the trended data points statistically. Thus, a deterministic (yes/no) assessment coupled with a mathematical function around input norms (e.g., SPC) may be applied to the predetermined signals to highlight that generalized model 430 is no longer performing as expected, and can lead to lower accuracy and greater error. Performance of corrective action (e.g., re-training estimated model 425 or complete re-selection of an appropriate model) may then be indicated.

The predetermined signals may be specific signals that are directly measured or derived signals that are obtained by performing mathematical calculations on one or more signals. Examples of predetermined signals that may be automatically monitored by programmable device 100 for changes to thereby determine model accuracy are as follows:

1. File type (e.g., number of types of URLs of a certain file extension).
2. Internal processes that serve as input to the data flow (e.g., other tools with algorithms applied).
3. External (customer/end user) processes as input to the data flow.
4. Features, both singularly and combinatorial. Features are variables or attributes of pieces of data in known data 405 that are used to identify patterns and train generalized model 430 to make predictions, diagnosis or classification.
5. Data decay, such as hardware crashes, and software crashes (including invoked cyber threats) that could have impacted the system and/or integrity of the output.
6. Mathematical verification (e.g., Specificity, Sensitivity, Generalized $R^2$, Root Mean Square Error, Recall, Precision, Accuracy, Residuals, generalization error, sample prediction error) indicating efficiency or error rate of model 425 (or 430).
7. Data indicating model fitting/overfitting between training dataset 410 and validation dataset 415 when relearning on a periodic basis.
8. Periodicity of learning in machine learning (e.g., daily, weekly, monthly).
9. Network architecture.
10. Design space of model, particularly boundaries (e.g., process variable thresholds).
11. Scale of model.
12. Where algorithm is applied (e.g., on premises/Client to Cloud, Cloud to on premises/Client).
13. Ground truth.
14. Noise.
15. Sources of error (identified from the original model build).
16. Contractual and/or liabilities.
17. Telemetry data sent from an enterprise to the cloud, to a back-office on the network or directly to a back-end.
18. Behavior metrics indicating typical user behavior that is measured and trended over time.
19. Significant growth of data.
20. Base rate (i.e., prevalence of signal occurring) indicating periodicity of a signal occurring.
21. Internal process changes (e.g., prior to applying actual model in the case of non-endpoint/client model held in non-customer-facing systems)

Programmable device 100 may automatically monitor each of the above signals using statistical tools (e.g., SPC) as any "process" (e.g., wafer fab etch process) would be monitored. For example, programmable device 100 may apply SPC x-bar, p, and c charts to assess the criticality and variability of changes, away from the norm and identify outliers. When programmable device 100 detects outliers (e.g., dependent on probability of occurrence away from mean), programmable device 100 may automatically apply prescriptive actions (e.g., decision trees). For example, programmable device 100 may indicate to a user that generalized model 430 should be updated (retrained using new data and redeployed). Further, programmable device 100 may apply a secondary machine learning predictive engine (e.g., ARIMA) to predict future data points associated with the predetermined signals and apply SPC to the predictions to make data distribution and model update determinations. In statistics and econometrics, and in particular in time series analysis, an ARIMA model is a generalization (i.e., integrative) of an autoregressive moving average (ARMA) model. These models are fitted to time series data either to better understand the data or to predict future points in the series (forecasting).

Statistical Process Control (SPC)

Statistical Process Control may be defined as the use of valid analytical methods to identify the existence of special causes of variation in a process. The theories behind SPC have been in use in industry since the 1950s, with various improvements having been made over the years, e.g., by identifying process variation, identifying its cause, selecting improvement methods, and removing the causes. Variation naturally occurs in most industrial systems due to common causes, but one key to measurable process improvement is to be able to identify when special causes of variation occur. In this manner, reaction is based on outliers caused by special causes, and the natural variation of the process (e.g., common causes) may be explored 'off-line.' To achieve this, SPC control charts with control limits (e.g., thresholds) may be used to react to the natural variation of the process due to common and special causes. A phenomenon is said to be controlled when, through the use of past experience, expected variation of the phenomenon in the future can be predicted, at least within limits. That is, the probability that the observed phenomenon will fall within the given limits can be approximated.

Referring now to FIG. 5, tables of exemplary Statistical Process Control (SPC) thresholds and probabilities are shown, according to one or more embodiments disclosed herein. Table 500 details the various probabilities and zones used in tests for unnatural patterns in measured control data, as established by Western Electric Company in 1956. As shown in Table 500, testing the data on a control chart for unnatural patterns due to special causes can be done statistically based on probability distributions. Examination of an 'x-bar' or mean chart in a normal distribution yields the probabilities of a process in control as seen in Table 500. In applying these probabilities, three characteristics of a natural pattern emerge: 1) most points are near the centerline (i.e., the sample average, or "x-bar," as referred to in table 500); 2) a few points are near the control limits (i.e., defined by the extent of Zone A); and 3) no points (or only a rare point) are beyond the control limits (i.e., lie outside of Zone A, in either the positive or negative direction from the centerline). Unnatural patterns, or those caused by special causes, typically involve the absence of one of these characteristics.

The so-called "Western Electric Rules" utilize these probabilities to test for instability of a process and to determine whether the system is changing or not, as shown in table 510. For example, the probability that a single point occurs outside the 3-sigma limit (i.e., beyond the extent of Zone A) is 0.0013. However, even when points remain within the 1-sigma limit (i.e., within the extent of Zone C), they still may be indicative of an unstable system. For example, the probability that eight consecutive measurement points in a row occur inside the 1-sigma limit (i.e., within the extent of Zone C), but all to one side of the centerline, is just 0.0039. These rules can easily be applied to a trend chart of data points of a predetermined signal automatically so that if any of the monitored statistical thresholds are violated, the system may issue a security alert to the user and/or suggest remedial action to bring the out of control (i.e., unstable) signal back within acceptable limits of statistical variation (i.e., improve model accuracy and efficiency) and/or indicate investigating the root cause of the out of control signal. Table 600 shown in FIG. 6 illustrates the Western Electric Rules for SPC with the corresponding point locations and detection thresholds, according to one or more embodiments disclosed herein. Table 600 represents eight exemplary SPC rules with the corresponding point location and detection thresholds to detect that a given rule has been violated. (Note: in some systems, the Rules may have different numbers, but the point locations and detection thresholds may remain the same.) It is to be understood that the rules shown in table 600 are merely exemplary, and that different or modified rules may be used for a given implementation, if so desired.

Figure 7:
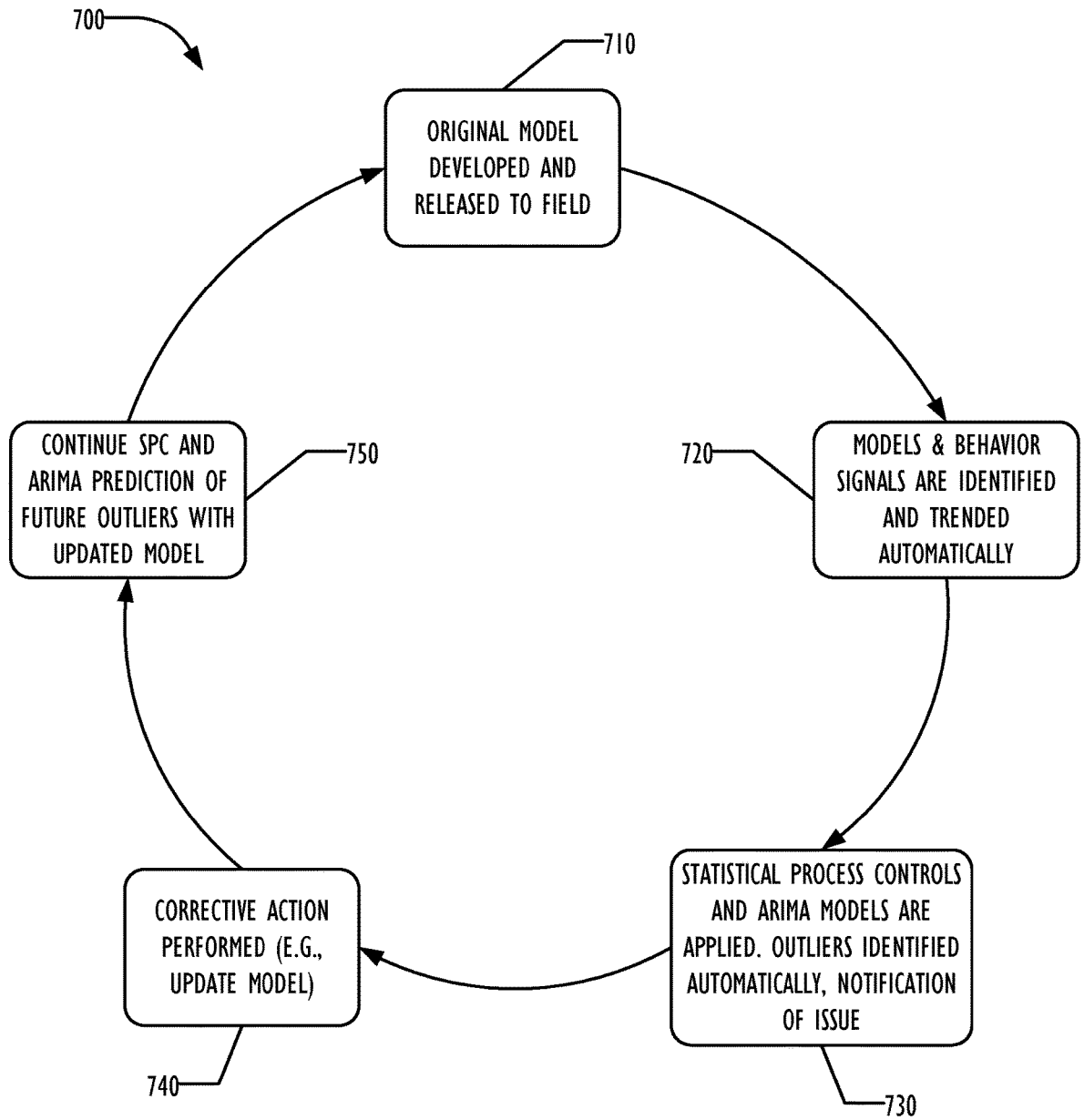
FIG. 7 is a flowchart illustrating a technique for using statistical tools for automated assessment of a model in production according to one or more embodiments disclosed herein.

FIG. 7 shows flowchart 700 illustrating a technique for using statistical tools for automated assessment of a model in production according to one or more embodiments disclosed herein. At block 710, the original model (e.g., generalized model 430) is developed and released to the field. The model may be a machine learning or deep learning model that is designed to address a particular problem or answer a particular question (e.g., detect malware). However, the model need not be a machine learning model and could be any type of data analytics model where a data science approach is utilized and could be applicable to a variety of fields (e.g., healthcare, finance, technology, or cybersecurity).

At block 720, programmable device 100 may identify and automatically trend model and behavior signals associated with the model, and at block 730, programmable device 100 may apply one or more statistical tools to the trended signals to automatically identify outliers and notify a user of signals that are out of control. As explained above, the signals may be predetermined specific signals associated with generalized model 430 and ecosystem 300 and derived from incoming data to monitor process changes and ensure high accuracy and efficiency of deployed generalized model 430. Programmable device 100 may trend one or more of the predetermined signals so that data points of each monitored signal are trended on a time series and programmable device 100 may apply one or more statistical tools to the trended data points to identify outliers. In one embodiment, programmable device 100 may apply SPC to the data points of the signals to determine whether data distribution of the incoming data as represented by the trended signals has changed from that of known data 405. Programmable device 100 may also apply an ARIMA model to the trended data points to predict future values of the incoming signal so as to derive inferences from the predictions and determine in advance whether the predictions indicate a signal that is out of control. SPC and ARIMA are only exemplary statistical tools that can be utilized for determining the data distribution. Other statistical tools may be utilized instead. Examples of other statistical tools include ARMA, Neural Networks, or other artificial intelligence, machine learning or deep learning based statistical tools. By applying the statistical tools, programmable device 100 automatically identifies outlier data points that may indicate that the outliers are caused by the existence of special causes of variation in the process. When such outliers are detected, programmable device 100 may identify the detection threshold of the point location that was violated (e.g., based on the Western Electric Rules) and issue an alert to the user based on the rule associated with the detection threshold. At block 740, programmable device 100 performs corrective action to address the out of control signal. For example, the corrective action may be based on the rule of the detection threshold that was violated by the out of control signal. In one embodiment, programmable device 100 may notify the user that the model needs to be updated. The user may then retrain and redeploy estimated model 425 using an updated dataset or model based on the incoming data to improve accuracy and using data related to ecosystem 300 indicating an updated configuration of ecosystem 300. Programmable device 100 may further notify the user to start an investigation to determine why the signal went out of control. In another embodiment, programmable device 100 may automatically update estimated model 425 by training with new pre-processed data based on new incoming data. Steps in blocks 710-740 may be performed iteratively so that after estimated model 425 is updated and generalized model 430 is redeployed in production after retraining (i.e., retrained and redeployed model; updated model), programmable device 100 may continue automatically monitoring and trending predetermined signals and applying one or more statistical tools to determine and predict outliers and out of control signals of the process based on the updated model (block 750) to continuously monitor accuracy of the updated model.

EXAMPLES

The following examples pertain to further embodiments.

Example 1 is a computer system configured for automated assessment of a model, comprising: a memory; and one or more processors communicatively coupled to the memory, wherein the memory comprises instructions stored therein, the instructions when executed cause the one or more processors to: train a model to perform at least one of a prediction operation, a diagnostic operation, and a classification operation based on a training dataset; deploy the model in production to perform the at least one operation on field data; monitor signal data associated with the model automatically, the signal data including specific or derived signal data representing characteristics of an ecosystem in which the model is deployed and new observations in incoming field data; monitor accuracy of the model by applying a statistical tool to a plurality of data points of the signal data; determine whether the signal data represents an unstable process by identifying outlier data points from among the plurality of data points of the signal data; and generate an indication that a corrective action should be taken on the model based on a result of the determination.

Example 2 comprises the subject matter of Example 1, wherein the model is at least one of a data analytics model, a machine learning model, and a deep learning model.

Example 3 comprises the subject matter of Example 1, wherein the instructions that cause the one or more processors to monitor signal data comprise instructions that cause the one or more processors to trend the plurality of data points of the signal data in a time series.

Example 4 comprises the subject matter of Example 3, wherein the signal data includes one or more of: file type data, internal process data, external process data, feature data, data decay data, mathematical verification data, model fitting data, machine learning periodicity data, network architecture data, design space boundary data, scale data, algorithm data, ground truth data, noise data, source of error data, contractual or liability data, model telemetry data, behavior metrics data, significant growth data, and base rate data.

Example 5 comprises the subject matter of Example 1, wherein the instructions that cause the one or more processors to apply a statistical tool to a plurality of data points of the signal data comprise instructions that cause the one or more processors to apply statistical process control to the plurality of data points of the signal data.

Example 6 comprises the subject matter of Example 5, wherein the instructions that cause the one or more processors to apply a statistical tool to the plurality of data points of the signal data further comprise instructions that cause the one or more processors to apply a secondary machine learning predictive engine to the plurality of data points of the signal data to predict future outlier data points of the signal data.

Example 7 comprises the subject matter of Example 6, wherein the instructions that cause the one or more processors to apply a secondary machine learning predictive engine comprise instructions that cause the one or more processors to apply at least one of an autoregressive integrated moving average model, an autoregressive moving average mode, and a neural networks model.

Example 8 comprises the subject matter of Example 1, wherein the instructions that cause the one or more processors to generate an indication that a corrective action should be taken on the model comprise instructions that cause the one or more processors to notify a user to retrain and redeploy the model or create a new model.

Example 9 comprises the subject matter of Example 1, wherein the instructions further cause the one or more processors to: automatically perform the corrective action on the model to retrain and redeploy the model or create a new model responsive to the indication; and continuously monitor accuracy of the retrained and redeployed model or the created new model by applying the statistical tool to the plurality of data points of the signal data.

Example 10 is a method for automated assessment of a model, comprising: training, with one or more processors, a model to perform at least one of a prediction operation, a diagnostic operation, and a classification operation based on a training dataset; deploying, with the one or more processors, the model in production on a computer system for performing the at least one operation on field data; monitoring, with the one or more processors, signal data associated with the model automatically, the signal data including specific or derived signal data representing characteristics of an ecosystem including the computer system on which the model is deployed and new observations in incoming field data; monitoring, with the one or more processors, accuracy of the model by applying a statistical tool to a plurality of data points of the signal data; determining, with the one or more processors, whether the signal data represents an unstable process by identifying outlier data points from among the plurality of data points of the signal data; generating, with the one or more processors, an indication that a corrective action should be taken on the model based on a result of the determination; and displaying the indication on a display.

Example 11 comprises the subject matter of Example 10, wherein the model is at least one of a data analytics model, a machine learning model, and a deep learning model.

Example 12 comprises the subject matter of Example 10, wherein monitoring signal data comprises trending the plurality of data points of the signal data in a time series.

Example 13 comprises the subject matter of Example 12, wherein the signal data includes one or more of: file type data, internal process data, external process data, feature data, data decay data, mathematical verification data, model fitting data, machine learning periodicity data, network architecture data, design space boundary data, scale data, algorithm data, ground truth data, noise data, source of error data, contractual or liability data, model telemetry data, behavior metrics data, significant growth data, and base rate data.

Example 14 comprises the subject matter of Example 10, wherein applying a statistical tool to a plurality of data points of the signal data comprises applying statistical process control to the plurality of data points of the signal data.

Example 15 comprises the subject matter of Example 14, wherein applying a statistical tool to a plurality of data points of the signal data further comprises applying a secondary machine learning predictive engine to the plurality of data points of the signal data to predict future outlier data points of the signal data.

Example 16 comprises the subject matter of Example 15, wherein applying a secondary machine learning predictive engine comprises applying at least one of an autoregressive integrated moving average model, an autoregressive moving average model, and a neural networks model.

Example 17 comprises the subject matter of Example 10, wherein generating an indication that a corrective action should be taken comprises notifying a user to retrain and redeploy the model or create a new model.

Example 18 comprises the subject matter of Example 10, wherein the method further comprises: automatically performing the corrective action on the model to retrain and redeploy the model or create a new model responsive to the indication; and continuously monitoring accuracy of the retrained and redeployed model or the created new model by applying the statistical tool to the signal data.

Example 19 is a non-transitory computer readable medium storing a program for automated assessment of a model, comprising computer executable instructions stored thereon to cause one or more processing units to: train a model to perform at least one of a prediction operation, a diagnostic operation, and a classification operation based on a training dataset; deploy the model in production to perform the at least one operation on field data; monitor signal data associated with the model automatically, the signal data including specific or derived signal data representing characteristics of an ecosystem in which the model is deployed and new observations in incoming field data; monitor accuracy of the model by applying a statistical tool to a plurality of data points of the signal data; determine whether the signal data represents an unstable process by identifying outlier data points from among the plurality of data points of the signal data; and generate an indication that a corrective action should be taken on the model based on a result of the determination.

Example 20 comprises the subject matter of Example 19, wherein the instructions further cause the one or more processing units to: automatically perform the corrective action on the model to retrain and redeploy the model or create a new model responsive to the indication; and continuously monitor accuracy of the retrained and redeployed model or the created new model by applying the statistical tool to the signal data.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

It is to be understood that the above description is intended to be illustrative, and not restrictive. For example, the above-described embodiments may be used in combination with each other. Many other embodiments will be apparent to those of skill in the art upon reviewing the above description. The scopes of the inventions therefore should be determined with reference to the appended claims, along with the full scope of equivalents to which such claims are entitled.

What is claimed is:

1. A computer system configured for automated assessment of a model, comprising:
   a memory; and
   one or more processors communicatively coupled to the memory, the memory including instructions that, when executed, cause the one or more processors to:
   train a model to perform at least one of a prediction operation, a diagnostic operation, or a classification operation based on a training dataset;
   deploy the model in a production computer system to perform the at least one operation on field data;
   monitor signal data associated with the model automatically, the signal data including specific or derived signal data representing characteristics of an ecosystem in which the model is deployed and new observations in incoming field data;
   monitor accuracy of the model by applying a statistical tool to a plurality of data points of the signal data;
   determine whether the signal data represents an unstable process by identifying outlier data points from among the plurality of data points of the signal data based on locations of data points of the signal data with respect to at least three sigma zones defined by corresponding standard deviations from the model, respectively;
   select a rule corresponding to the outlier data points, the rule to suggest at least one of a cause of the unstable process or an effect of the unstable process on the signal data; and
   generate an indication that a corrective action should be taken on the model based on a result of the determination, the indication to identify the rule and at least one of the cause of the unstable process or the effect of the unstable process on the signal data.

2. The computer system according to claim 1, wherein the model is at least one of a data analytics model, a machine learning model, or a deep learning model.

3. The computer system according to claim 1, wherein the instructions when executed, cause the one or more processors to trend the plurality of data points of the signal data in a time series.

4. The computer system according to claim 3, wherein the signal data includes one or more of: file type data, internal process data, external process data, feature data, data decay data, mathematical verification data, model fitting data, machine learning periodicity data, network architecture data, design space boundary data, scale data, algorithm data, ground truth data, noise data, source of error data, contractual or liability data, model telemetry data, behavior metrics data, significant growth data, or base rate data.

5. The computer system according to claim 1, wherein the instructions, when executed, cause the one or more processors to apply statistical process control to the plurality of data points of the signal data.

6. The computer system according to claim 5, wherein the instructions, when executed, cause the one or more processors to apply a secondary machine learning predictive engine to the plurality of data points of the signal data to predict future outlier data points of the signal data.

7. The computer system according to claim 6, wherein the instructions, when executed, cause the one or more processors to apply at least one of an autoregressive integrated moving average model, an autoregressive moving average mode, or a neural networks model.

8. The computer system according to claim 1, wherein the instructions, when executed, cause the one or more processors to notify a user to at least one of retrain and redeploy the model, or create a new model.

9. The computer system according to claim 1, wherein the instructions, when executed, cause the one or more processors to:
automatically perform the corrective action on the model to at least one of retrain and redeploy the model, or create a new model responsive to the indication; and
continuously monitor accuracy of the retrained and redeployed model or the created new model by applying the statistical tool to the plurality of data points of the signal data.

10. A method for automated assessment of a model, the method comprising:
training, with one or more processors, a model to perform at least one of a prediction operation, a diagnostic operation, or a classification operation based on a training dataset;
deploying, with the one or more processors, the model in a production computer system for performing the at least one operation on field data;
monitoring, with the one or more processors, signal data associated with the model, the signal data including specific or derived signal data representing characteristics of an ecosystem including the computer system on which the model is deployed and new observations in incoming field data;
monitoring, with the one or more processors, accuracy of the model by applying a statistical tool to a plurality of data points of the signal data;
determining, with the one or more processors, whether the signal data represents an unstable process by identifying outlier data points from among the plurality of data points of the signal data based on locations of data points of the signal data with respect to at least three sigma zones defined by corresponding standard deviations from the model, respectively;
selecting, with the one or more processors, a rule corresponding to the outlier data points, the rule to suggest at least one of a cause of the unstable process or an effect of the unstable process on the signal data;
generating, with the one or more processors, an indication that a corrective action should be taken on the model based on a result of the determination, the indication to identify the rule and at least one of the cause of the unstable process or the effect of the unstable process on the signal data; and
displaying the indication on a display.

11. The method according to claim 10, wherein the model is at least one of a data analytics model, a machine learning model, or a deep learning model.

12. The method according to claim 10, wherein the monitoring of the signal data includes trending the plurality of data points of the signal data in a time series.

13. The method according to claim 12, wherein the signal data includes one or more of: file type data, internal process data, external process data, feature data, data decay data, mathematical verification data, model fitting data, machine learning periodicity data, network architecture data, design space boundary data, scale data, algorithm data, ground truth data, noise data, source of error data, contractual or liability data, model telemetry data, behavior metrics data, significant growth data, or base rate data.

14. The method according to claim 10, wherein the applying of the statistical tool to a plurality of data points of the signal data includes applying statistical process control to the plurality of data points of the signal data.

15. The method according to claim 14, wherein the applying of the statistical tool to a plurality of data points of the signal data further includes applying a secondary machine learning predictive engine to the plurality of data points of the signal data to predict future outlier data points of the signal data.

16. The method according to claim 15, wherein the applying of the secondary machine learning predictive engine includes applying at least one of an autoregressive integrated moving average model, an autoregressive moving average model, or a neural networks model.

17. The method according to claim 10, wherein the generating of the indication that the corrective action should be taken includes notifying a user to retrain and redeploy the model or create a new model.

18. The method according to claim 10, further including:
automatically performing the corrective action on the model to at least one of retrain and redeploy the model, or create a new model, responsive to the indication; and
continuously monitoring accuracy of the retrained and redeployed model or the created new model by applying the statistical tool to the signal data.

19. A non-transitory computer readable medium comprising computer executable instructions that, when executed, cause one or more processing units to:
train a model to perform at least one of a prediction operation, a diagnostic operation, or a classification operation based on a training dataset;
deploy the model in a production computer system to perform the at least one operation on field data;
monitor signal data associated with the model automatically, the signal data including specific or derived signal data representing characteristics of an ecosystem in which the model is deployed and new observations in incoming field data;

monitor accuracy of the model by applying a statistical tool to a plurality of data points of the signal data;

determine whether the signal data represents an unstable process by identifying outlier data points from among the plurality of data points of the signal data based on locations of data points of the signal data with respect to at least three sigma zones defined by corresponding standard deviations from the model, respectively;

select a rule corresponding to the outlier data points, the rule to suggest at least one of a cause of the unstable process or an effect of the unstable process on the signal data; and generate an indication that a corrective action should be taken on the model based on a result of the determination, the indication to identify the rule and at least one of the cause of the unstable process or the effect of the unstable process on the signal data.

20. The non-transitory computer readable medium of claim 19, wherein the instructions, when executed, cause the one or more processing units to:

automatically perform the corrective action on the model to retrain and redeploy the model or create a new model responsive to the indication; and continuously monitor accuracy of the retrained and redeployed model or the created new model by applying the statistical tool to the signal data.

* * * * *